US007797298B2

(12) United States Patent
Sareen et al.

(10) Patent No.: US 7,797,298 B2
(45) Date of Patent: Sep. 14, 2010

(54) SERVING CACHED QUERY RESULTS BASED ON A QUERY PORTION

(75) Inventors: Gaurav Sareen, Bellevue, WA (US); Michael Acheson Isard, San Francisco, CA (US); Yinzhe Yu, Bellevue, WA (US); Girish Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/363,895

(22) Filed: Feb. 28, 2006

(65) Prior Publication Data

US 2007/0203890 A1    Aug. 30, 2007

(51) Int. Cl.
*G06F 17/30* (2006.01)
*G06F 15/16* (2006.01)
(52) U.S. Cl. .................... 707/706; 707/758; 707/765
(58) Field of Classification Search .............. 707/200, 707/3
See application file for complete search history.

(56) References Cited

U.S. PATENT DOCUMENTS

| 6,487,641 | B1 * | 11/2002 | Cusson et al. ............... 711/144 |
| 6,578,032 | B1 * | 6/2003 | Chandrasekar et al. ......... 707/6 |
| 6,813,633 | B2 * | 11/2004 | Wong et al. .................. 709/217 |
| 7,027,975 | B1 * | 4/2006 | Pazandak et al. ............... 704/9 |
| 7,089,301 | B1 * | 8/2006 | Labio et al. .................. 709/224 |
| 7,149,748 | B1 * | 12/2006 | Stephan ...................... 707/102 |
| 7,487,145 | B1 * | 2/2009 | Gibbs et al. .................... 707/4 |
| 2002/0095421 | A1 | 7/2002 | Koskas |
| 2003/0115187 | A1 * | 6/2003 | Bode et al. .................... 707/3 |
| 2003/0120752 | A1 | 6/2003 | Corcoran |
| 2005/0283468 | A1 * | 12/2005 | Kamvar et al. ................. 707/3 |
| 2006/0206454 | A1 * | 9/2006 | Forstall et al. ................ 707/3 |

FOREIGN PATENT DOCUMENTS

| WO | WO0017765 A1 | 3/2000 |
| WO | WO 2005031607 A1 | 4/2005 |

OTHER PUBLICATIONS

Sullivan, Danny, "What Are Stop Words?", Search Engine Watch, http://searchenginewatch.com/2156061, Jan. 1, 2003.*

* cited by examiner

*Primary Examiner*—Tony Mahmoudi
*Assistant Examiner*—Brittany N McCue
(74) *Attorney, Agent, or Firm*—Woodcock Washburn LLP (57) ABSTRACT

The embodiments contemplate a system and method for obtaining related results for a portion of a query and for generating an updated set of queries for a cache of a server. Other queries beginning with the portion of the query may be identified and obtained from a data structure that includes a server cache and a set of common queries. Once the other queries are identified, results for the other queries are obtained from the server cache or from a back-end database. A set of common queries, which may include deleted and additional queries, may be utilized to generate the updated set of queries for the server. Both missing queries and deleted queries that may belong to the server based on an assignment function are inserted into a queue, which is later delivered to the cache of the server. The transfer may occur during a low-activity or idle state.

20 Claims, 8 Drawing Sheets

SERVING CACHED QUERY RESULTS BASED ON A QUERY PORTION

BACKGROUND

A web search engine directs a user's search, or query, to a distributor server, which in, turn forwards the query to a front-end server. The front-end server may contain queries and corresponding results or may consult with a back-end database for the results of queries. The web search engine often receives repeated queries from users entering the same search terms. Recent queries and their results may be maintained in the front-end caches of the front-end server for a predetermined amount of time, since it is more efficient and less time-consuming to consult the front-end cache for the desired results than it is to consult the back-end database, which contains a full web index and is typically larger then the front-end cache. A full web index may include all available web results, such as web pages; therefore, resulting in a time-consuming search since the index is much larger than the results stored at the front-end cache. However, if the desired results are not found in the front-end cache, the back-end database may be consulted.

In addition to storing recent queries and results, the front-end caches may also serve as a record of useful searches, which may include those results which users more frequently have consulted or those results which a system administrator believes will be consulted.

A user typically must enter a full search term or query in order to be presented with relevant results. If a portion of a query, such as the first few characters, is entered, the user is often presented with error messages or incorrect results. Additionally, if a user is unsure of the query to enter in order to receive results, the user must individually enter several queries and sort through the results to find desired web pages, for example. It would be desirable for a user to enter a portion of a query and receive relevant results for a group of queries beginning with the entered portion. Additionally, as the user continues to enter the query, thereby extending the portion, it would be desirable for the results to automatically adjust as the query changes.

Additionally, such a portion-querying mechanism would be further desirable if resources were preserved and operations completed faster by further utilization of the front-end cache.

SUMMARY

Related results for a portion of a query are obtained by identifying other queries beginning with the portion of the query and obtaining the results of the other queries. The portion of the query may be assigned to a front-end server that receives other queries beginning with the same portion of the query. The other queries may be stored in a data structure that includes a server cache and a common set of queries. The results of the other queries may be stored in the server cache or in a back-end database.

A set of common queries may be formed by compiling deleted queries deleted from the server cache. The set of common queries may also include additional queries from a predetermined list.

An updated set of queries for the server cache may be computed using the set of common queries. A missing query may be a query that belongs to the server cache but perhaps is not stored in the server cache. The missing query may be part of the set of common queries. The missing query may be inserted in a queue and later placed in the server cache during a period of idleness or low-activity. Similarly, an expired query, deleted from the server cache, may also be inserted in the queue and later placed in the server cache.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION

Figure 1:
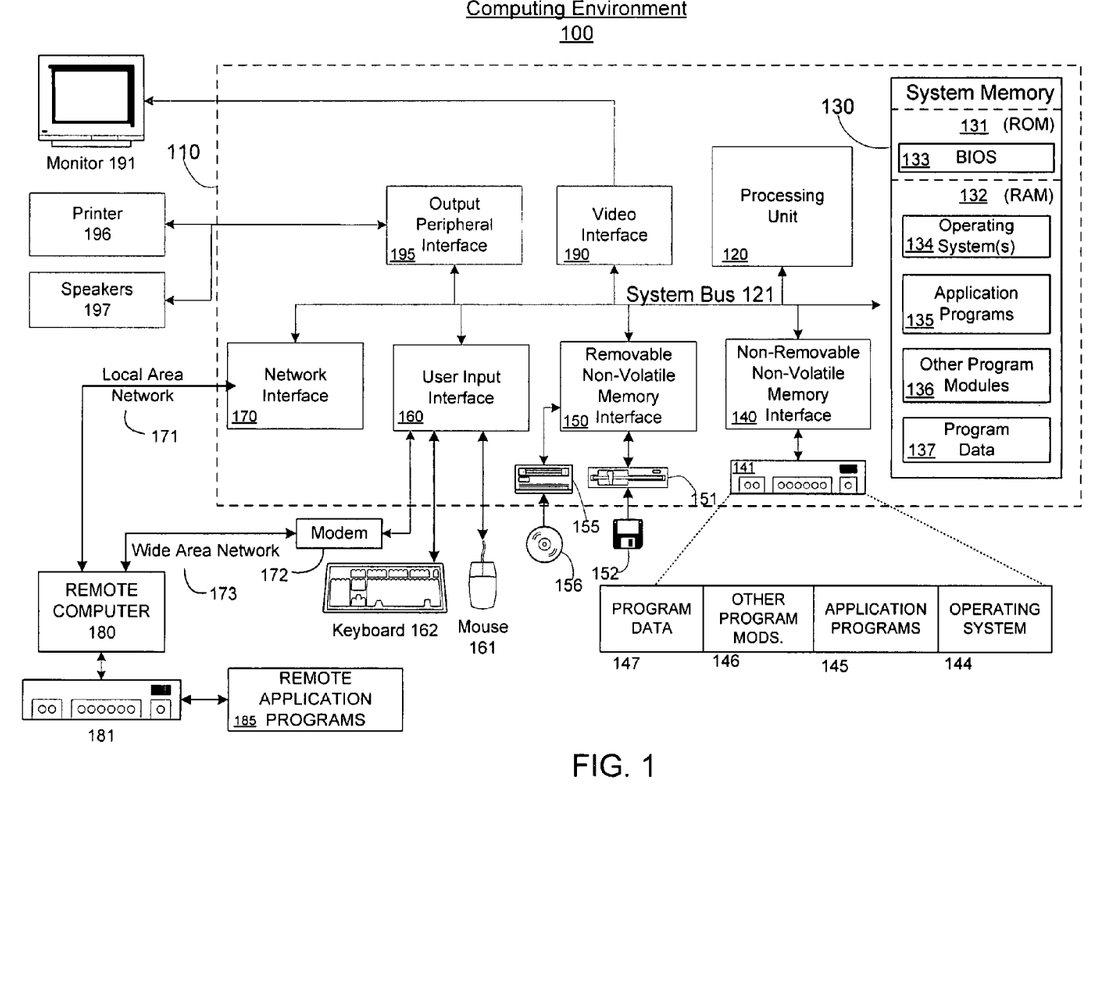
FIG. 1 is a is a block diagram representing an exemplary computing device.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

Figure 2:
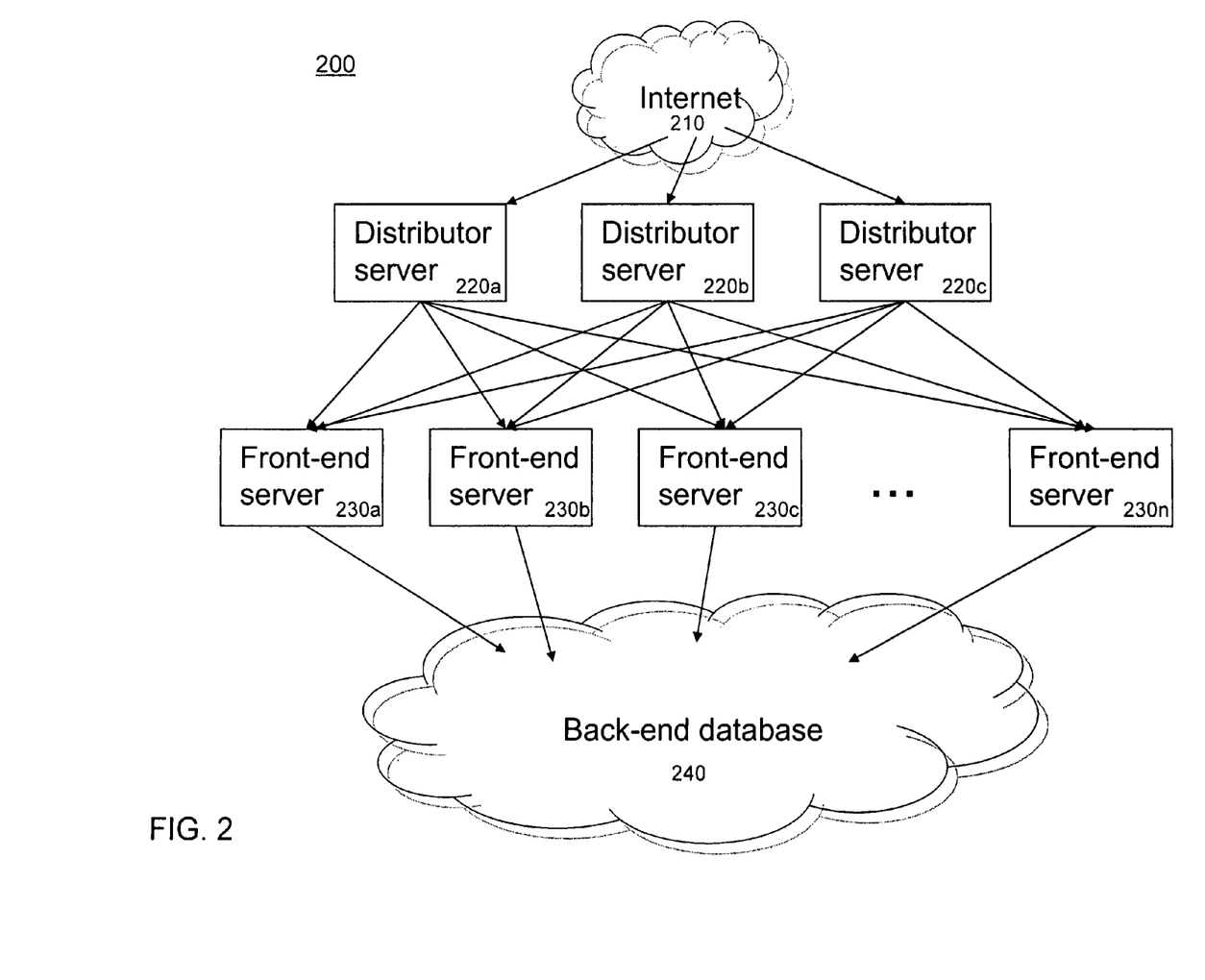
FIG. 2 is a block diagram representing an exemplary server organization.

FIG. 2 represents a server organization 200 that may be utilized to provide results for queries, such as queries or portions of queries entered in an internet search engine through, for example, the computer 110. A query originates at the internet 210, where a user may insert a query for which they desire to obtain relevant results, such as web pages directed to the query. The query may be entered at a search engine, which may allow the user to insert the query of interest and which may display the relevant results for the user to access. The internet 210 may be connected to a distributor server 220, which receives the query from the internet 210. Multiple distributor servers 220 may be connected to the internet 210. FIG. 2 illustrates three distributor servers 220 (220a, 220b, and 220c), although the number of the distributed servers 220 is not so limited. The query may be assigned to a particular one of the distributor servers 220 by, for example, an originating internet protocol (IP) address of the query. Other schemes may be utilized to assign the query to one of the distributor servers 220. Alternatively, the query may randomly be sent to any one of the distributor servers 220.

The distributor server 220 that receives the query may transmit the query to a front-end server 230, such as one of the front-end servers 230a, 230b, 230c, and 230n shown in the server organization 200 of FIG. 2. The server organization 200 is not limited to a certain number of the front-end servers 230. The front-end server 230 that receives the query from the distributor server 220 may do so based on a mapping that links the query to the front-end server 230. For example, the query may be hashed to produce a value, which in turn is used in a mapping function that places certain queries in specific front-end servers 230 and may ensure that the same query is always, or nearly so, directed to the same front-end server 230. The mapping function may determine which of the front-end servers 230 will receive the query. The front-end server 230 need not be assigned based on a mapping function and can instead, for example and not by limitation, randomly receive the query.

A cache, or local storage, may contain queries and their corresponding results. The cache may be part of the front-end server 230, and the cache's queries and results may be a set of recent queries and results, such as those from a predetermined time period, for example three hours. When the front-end server 230 receives the query from the distributor server 220, the front-end server 230 may search its cache to determine if the query, and its corresponding results, are already stored in the cache. If the query is in the cache, then the front-end server 230 may return the results from the cache. The results may be provided to the user who entered the query.

The front-end servers 230 may be in communication with a back-end database 240, which may contain existing results, for example web pages. Query results may be stored in the back-end database 240. If the entered query is not in the cache of the front-end server 230, then the back-end database 240 may be consulted in order to return relevant query results to the user. As the back-end database 240 typically is much larger than the cache of the front-end servers 230, consultation with the back-end database may take a significantly longer amount of time than does consultation with the cache of the front-end servers 230. Therefore, consultation with the back-end database 240 may only occur, for example, when the front-end server 230 does not contain the requested results or when the front-end server 230 encounters a problem, such as a server failure.

Figure 3:
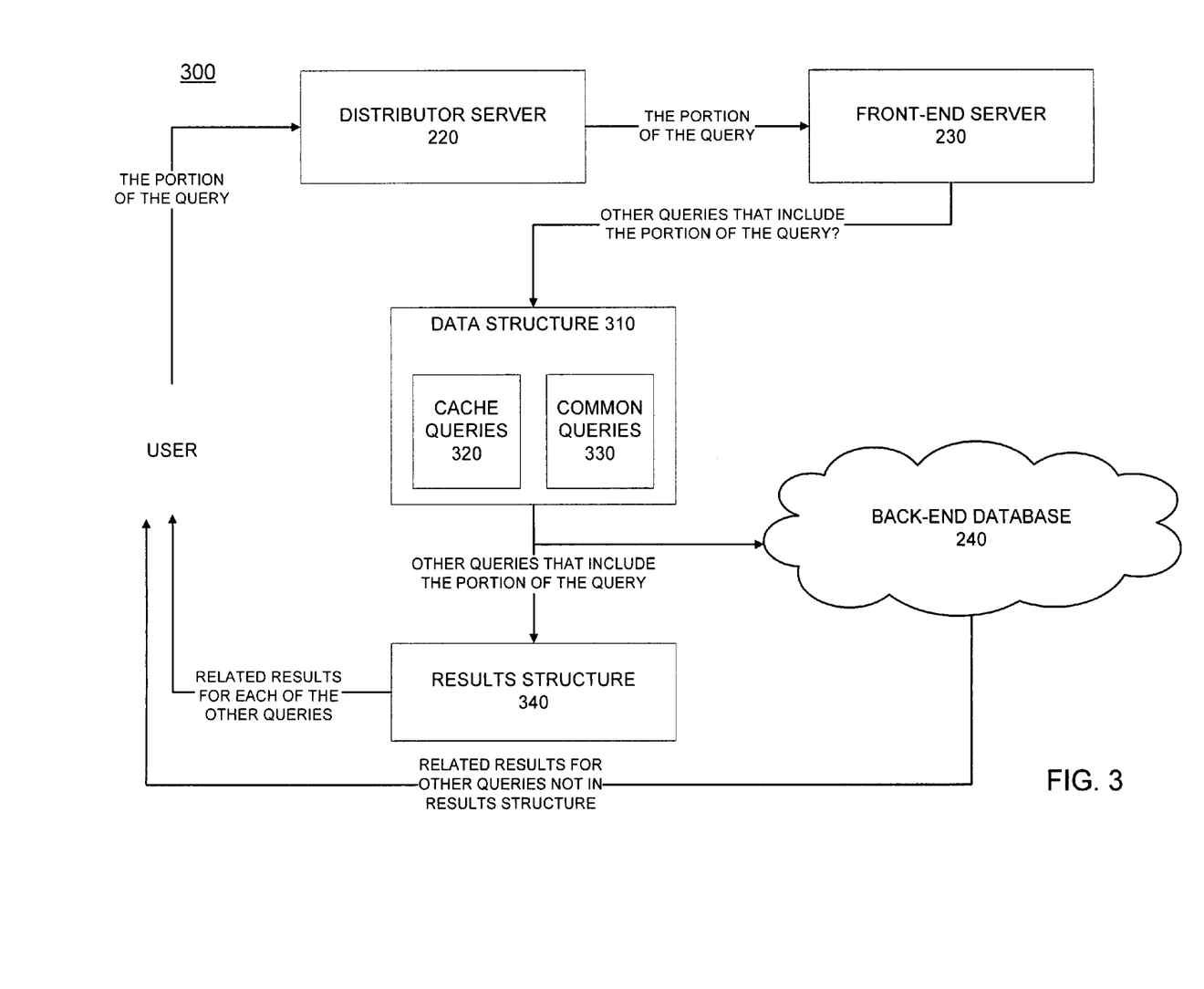
FIG. 3 is a block diagram representing a query system.

FIG. 3 is a block diagram representing a query system 300, which may be utilized for obtaining results to a portion of a query. The query system 300 may include the distributor server 220 for receiving a portion of a query. The portion of the query may be, for example, the first three characters of a query. A user, who desires results to the query, may type or enter the portion of the query in an internet search engine. The portion of the query may be directed to the distributor server 220 based on an IP address of the computer 110 from where the portion of the query originates. The portion of the query may be randomly directed to the distributor server 220.

The distributor server 220 may be responsible for assigning the portion of the query to the front-end server 230. A hash function may be used by the distributor server 220 for this assignment task. The distributor server 220 may, for example, assign the portion of the query to the front-end server 230 so that other queries that have the same portion will be assigned to the same front-end server 230. After the portion of the query is assigned to the front-end server 230, the distributor server 220 may transmit the portion of the query to the assigned front-end server 230.

Once the front-end server 230 receives the portion of the query, the front-end server 230 may be responsible for performing a search in order to obtain other queries that have the same portion as the portion of the query. In order to obtain these queries, the front-end server 230 may consult a data structure 310. The data structure 310, although shown as a separate component in FIG. 3, may be part of the front-end server 230. The data structure 310 may include a server cache, such as cache queries 320. The cache queries 320 may include previous queries that have been maintained in the data structure 310 for a predetermined time period. Thus, the cache queries 320 may, for example, include the most recent queries. The cache queries 320 may be maintained in the data structure 310 for easy and fast access to recent queries. The data structure 310 may also include a set of common queries 330. The formation of the set of common queries is described in more detail below.

The data structure may be an augmented trie structure, which is a structure that facilitates fast retrieval of information related to a query or a portion of a query. For example, possible portions of a query along with additional information related to each portion of the query may be stored in the trie structure. The information related to each portion of the query may for example be a list of a predetermined number of most frequently requested queries beginning with the portion of the query. The list may be sorted in a descending order of frequency, so that the most common requested query beginning with the portion of the query is first listed.

When a list of other queries, which may include the portion of the query, is obtained from the data structure 310, a results structure 340, which may be a cache structure, is consulted. The results structure may be a part of the front-end server 230. The results structure 340 contains results for queries. Upon consultation with the results structure 340, results for queries that begin with the portion of the query are obtained and provided to the user. These results may be, for example, a multiple selection of web pages.

The back-end database 240 may also be included as part of the query system 300. The back-end database 240 may be consulted if results for one or more of the queries that include the portion of the query are not located in the results structure 340. The results obtained from the back-end database 240 are also provided to the user, as shown in FIG. 3.

Figure 4:
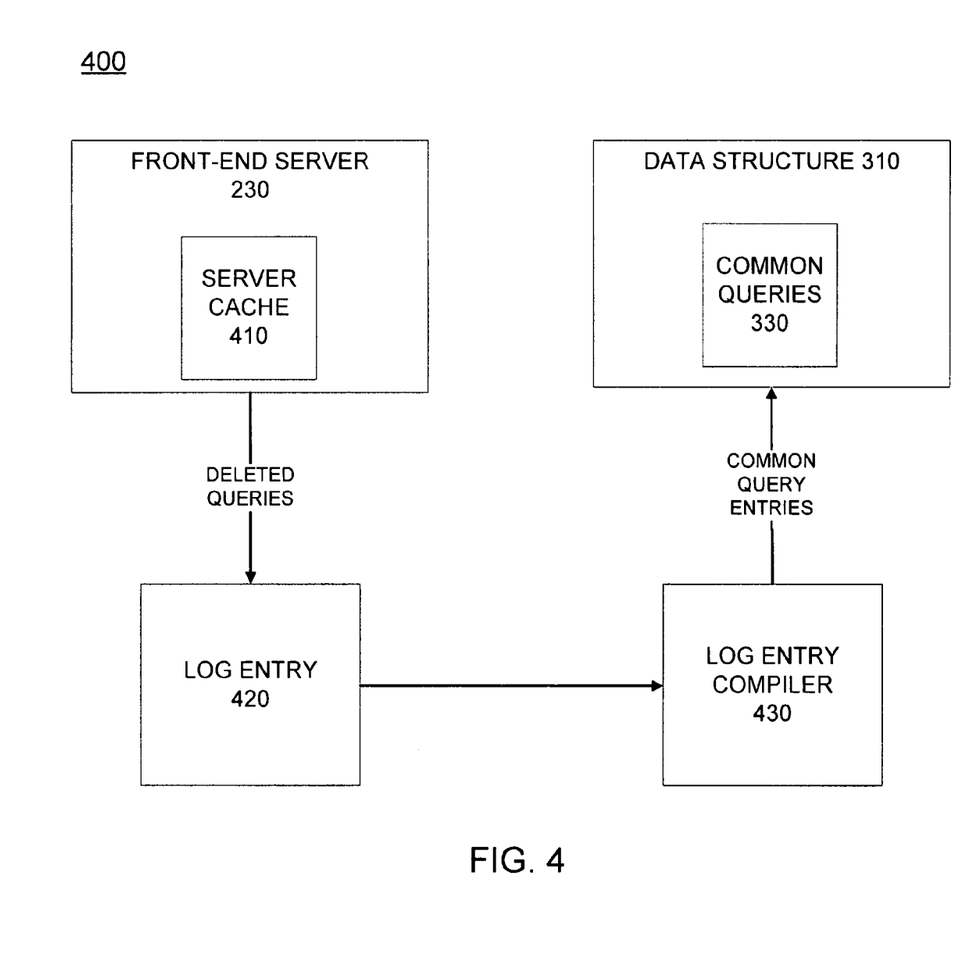
FIG. 4 is a block diagram representing a query constructing system.

A block diagram representation of a common query constructing system 400 is illustrated in FIG. 4. The system 400 may be assigned the task of creating the common queries 330, which may be utilized to obtain queries that have the same portion as the portion of the query. The common query constructing system 400 may include the front-end server 230, which receives the portion of the query from the distributor server 220. A server cache 410 may be part of the front-end server 230. The server cache 410 may be a cache structure of the front-end server 230 that stores previous queries, such as queries that have been maintained for a predetermined period of time. The server cache 410 of the front-end server 230 may be the same component as the cache queries 320 of the data structure 310, which may be part of the front-end server 230.

Queries may often be deleted from the server cache 410 of the front-end server 230. The deletions may occur due to the limited size of the server cache 410; a query may need to be deleted in order to create storage space for a newer query (or portion of the query). Or, the deletions may occur periodically. When the queries are deleted from the server cache 410, a log entry 420 may receive and track the deleted queries. After a predetermined time period has elapsed, the log entry 420 may provide the deleted queries to a log entry compiler 430, which compiles the deleted entries. The log entry compiler 430 may compile the deleted entries based on previously determined criteria, such as, for example, those entries that appear more than once over a period of one week. The log entry compiler 430, once it has completed the compilation of deleted queries, may provide the compilation to the common queries 330 of the data structure 310. The data structure 310 then stores the common queries for use in providing queries that have the same portion as the portion of the searched query to the results structure 340.

The common queries 330 may serve as a supplement to the cache queries 320. The cache queries 320 may be more recent queries, while the common queries 330, which may not necessarily be recent queries, may be frequently requested queries from a predetermined, relatively long time period, such as one week.

Figure 5A:
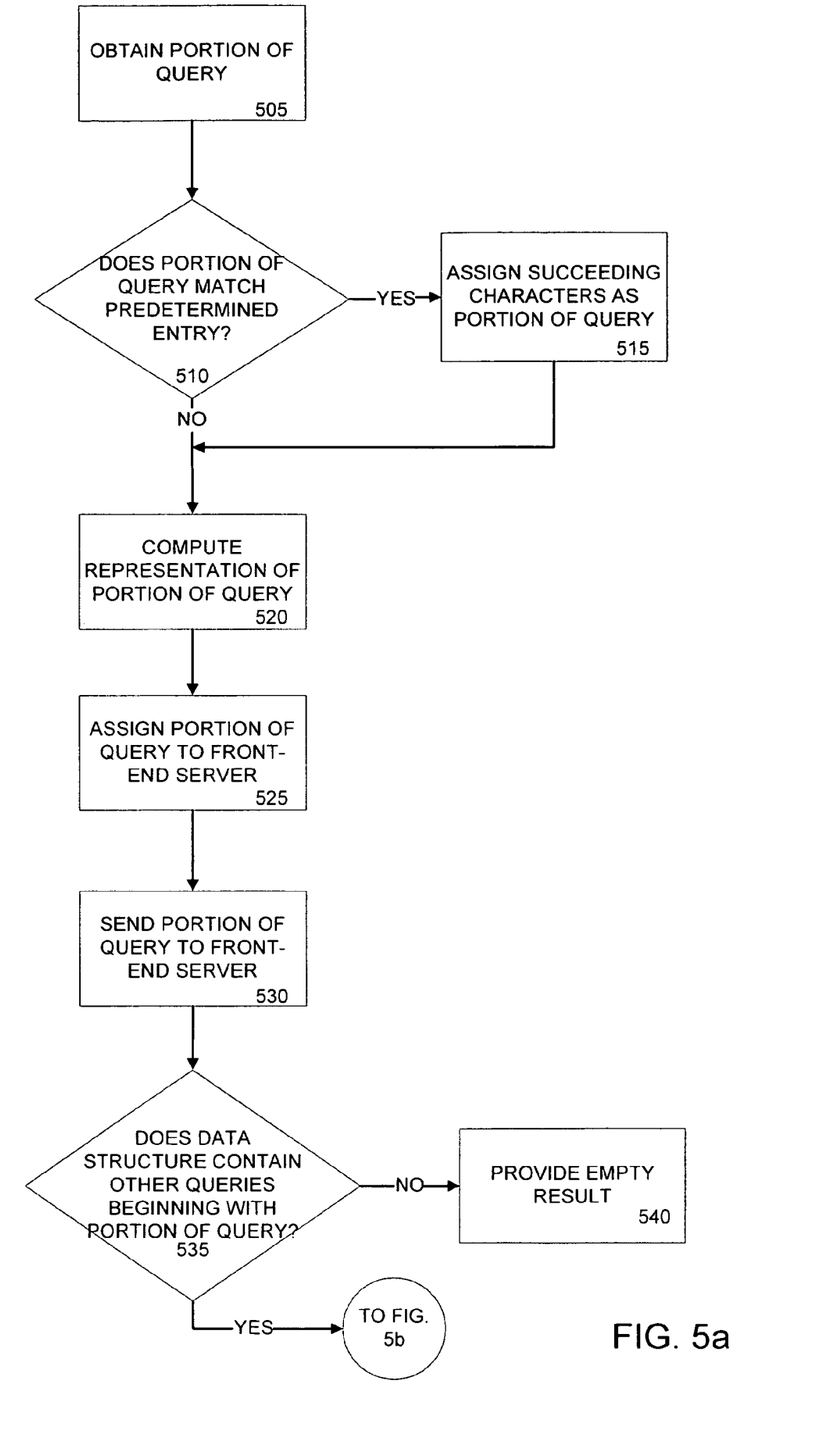
FIGS. 5a and 5b are a flow diagram illustrating one embodiment of a method of providing query results.
Figure 5B:
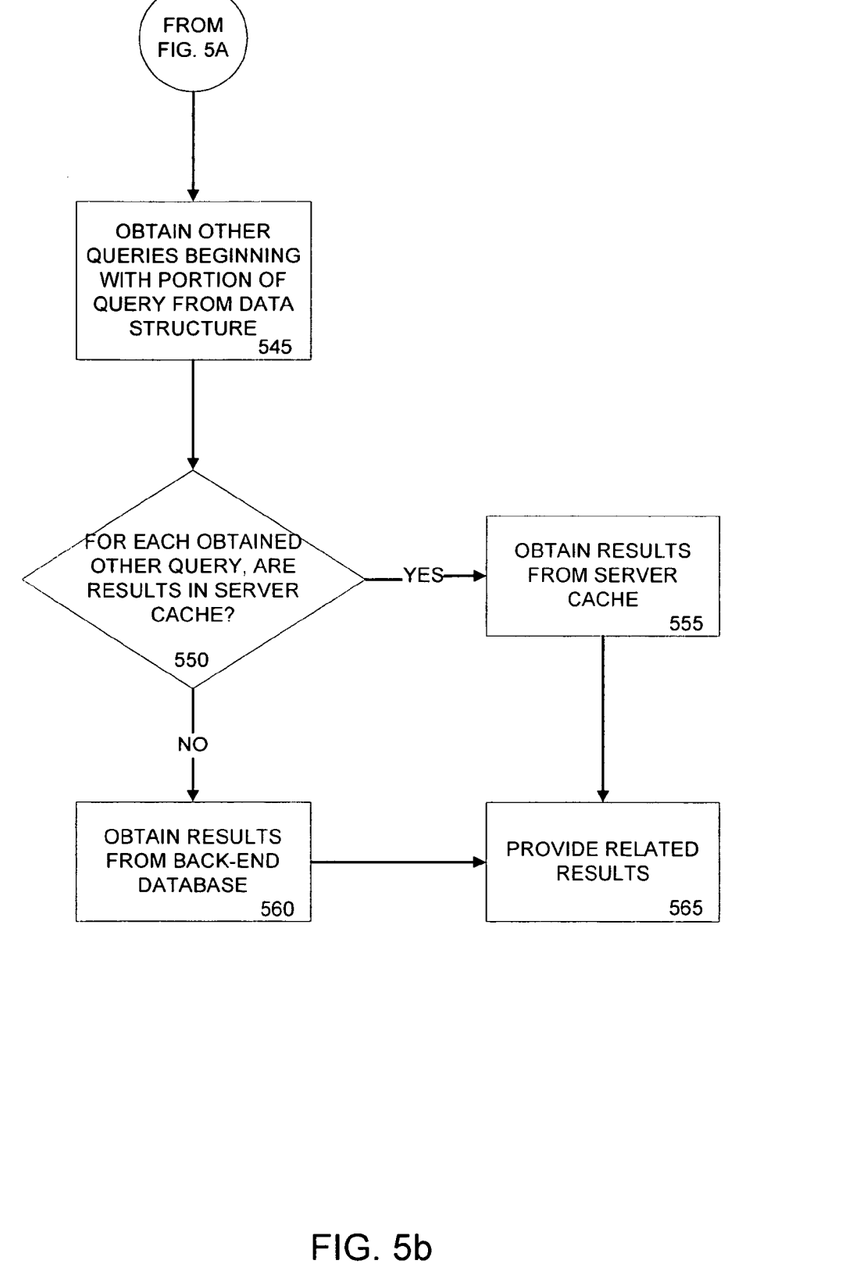

FIGS. 5a and 5b illustrate a method of providing query results. At 505, a portion of a query is obtained. The portion of the query may be initiated by a user, who, desiring results related, to the query, enters the portion of the query in an internet search engine for example. The portion of the query may be obtained at the distributor server 220. At 510, the portion of the query is examined in order to determine if the portion of the query matches a predetermined entry. If the portion of the query matches a predetermined entry, then, at 515 succeeding characters are assigned as the portion of the query. Because a number of frequently-occurring entries may exist that the user does not intend to be a part of the query, this comparison may eliminate providing query results for undesired queries. For example if a user enters such queries beginning with "http" and "www," the user typically does not want to search these queries but may instead be interested in the characters following these frequently-occurring entries. Thus, by assigning succeeding characters, such as three characters following "www," as the portion of the query, the proper portion of the query may be searched. The portion of the query may be compared to other predetermined entries, After succeeding characters are assigned as the portion of the query, and if the portion of the query does not match a predetermined entry, then the method of providing query results may proceed to 520 from 515 and 510, respectively. At 520, a representation of the portion of the query may be computed. This representation may be a hash function of the portion of the query, for example. Other representations are also possible.

At 525, following 520, the portion of the query may be assigned to a front-end server 230. As a representation of the portion of the query was computed at 520, then the representation may be used in order to assign the portion of the query to the front-end server 230. Other assignment criteria may be used for assigning the portion of the query to the front-end server. Or, the assignment may be a random selection. At 530, the portion of the query may be sent to the assigned front-end server 230.

535 determines if a data structure, such as the data structure 310 described above with relation to FIG. 3 and FIG. 4, contains queries beginning with the portion of the query. If the data structure 310, which may include cache queries 320 that may include previous queries that have been maintained in the data structure 310 for a predetermined time period and common queries 330, does not contain queries beginning with the portion of the query, then the user, at 540, is provided an empty result list. If, however, the data structure 310 does contain queries beginning with the portion of the query, then the method proceeds to 545 (FIG. 5b). At 545, the queries beginning with the portion of the query may be obtained from the data structure 310.

At 550, a determination is made to ascertain if, for each obtained query beginning with the portion of the query, results are stored in a server cache, such as the results structure 340, which may be part of the front-end server 230. At 560, if results for an obtained query beginning with the portion of the query are not in the results structure 340, then the results are obtained from the back-end database 240. At 555, if instead results for an obtained query beginning with the portion of the query are in the results structure 340, then the results are obtained from the results structure 340. The determination at 550 is performed for each obtained query that includes the portion of the query. This may ensure that results are provided for each query that includes the portion of the query, whether the results be from the back-end database 240 or the results structure 340. The query providing method ends at 565 where the results are provided.

Figure 6:
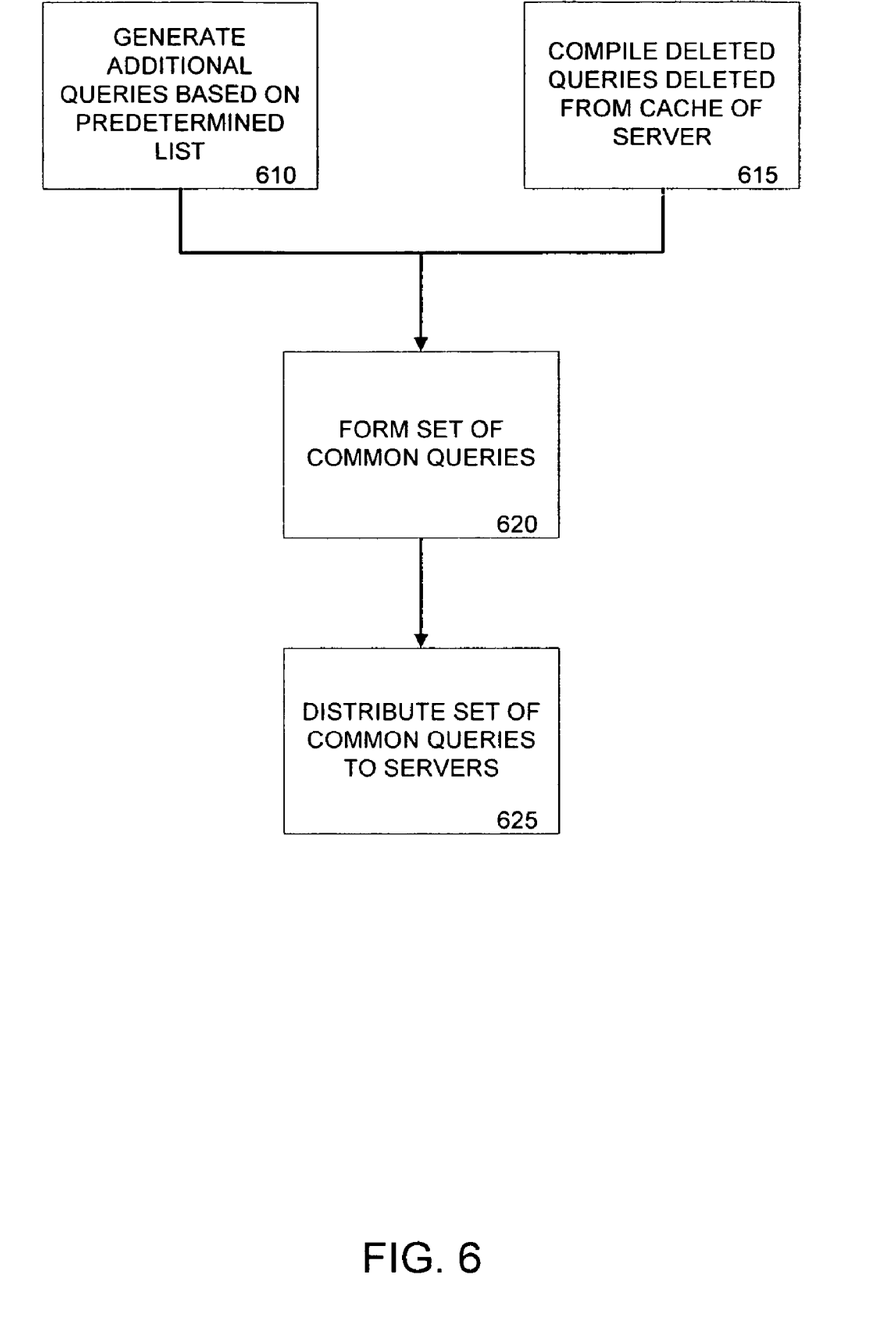
FIG. 6 is a flow diagram illustrating one embodiment of a method of constructing a set of common queries.

FIG. 6 is a flow diagram illustrating a method of constructing a set of common queries. At 610, queries are generated based on a predetermined list. The predetermined list may include queries that a system administrator believes should be part of the set of common queries 330. For example, a predetermined query may be a new movie that has not been used in query searches by users but that is expected to become popular and widely searched in the near future. By adding such queries to the common queries 330, which is part of the data structure 310, a search for the query, or portion of the query, may not require consultation with the back-end database 240.

At 615, queries deleted from a cache of a server, such as the server cache 410 of the front-end server 230 or the cache queries 320, are compiled. The deleted queries may be compiled over a predetermined time period. The deleted queries may be tracked by the log entry 420 and compiled by the log entry compiler 430, as discussed above with relation to the common query constructing system 400 of FIG. 4.

At 620, the set of common queries 330 is formed. The common queries may include a combination or compilation of the predetermined queries, generated at 610, and the deleted queries, generated at 615. After the common queries 330 are formed, at 625, the common queries 330 are distributed to the front-end servers 230. If the deleted queries are those deleted from a particular front-end server, such as the front-end server 230b of FIG. 2, then the common queries may be distributed to the other front-end servers 230a, 230c, and 230n of the system 200.

Figure 7:
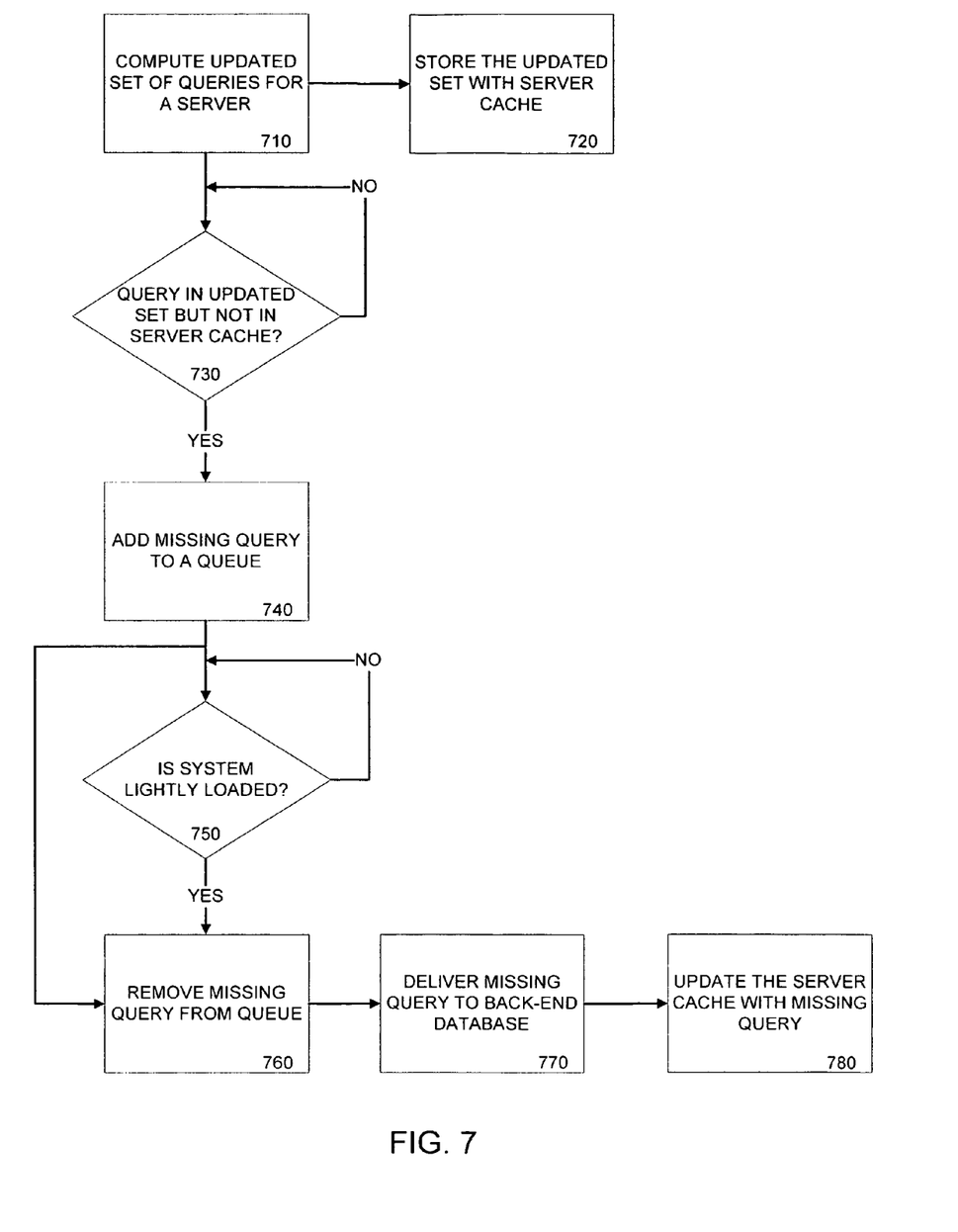
FIG. 7 is a flow diagram illustrating one embodiment of a method of updating a set of cache queries.

FIG. 7 is a flow diagram illustrating a method of updating the cache queries 320 of a data structure 310 of a front-end server, which may be part of a front-end server 230. The cache queries 320 may include recent queries. At 710, an updated set of queries is computed. The updated set of queries may include queries from the common queries 330 that would be assigned to the front-end server 230 based on, for example, a hashing and mapping operation that operates to direct the same queries and the same portions of the queries to the same front-end server 230. The updated set of queries may be computed by the front-end server 230. At 720, the updated set of queries may be stored in the data structure 310 with the cache queries 320. This serves to update the cache queries 320.

At 730, a query in the updated set of queries but not in the cache queries 320 (a missing query) is determined. If no query matches this criteria, the method proceeds to search for a query that does match the criteria. The method continues so that the missing query is added to the cache queries 320. At 740, the missing query is added to a queue.

The method may proceed to 750, where the system is analyzed to determine if the system is lightly loaded. Each time a front end server 230 sends a request to the back-end system 240, the response from the back-end system 240 may include feedback that can be used to determine the current status of the back-end 240, which may include current back-end load. For example, the feedback may include an average number of requests sitting in a queue waiting to be processed by the back-end 240 or a quality of an answer the back-end 240 is able to obtain during a query processing time limit. The front-end server 230 may then use an algorithm to determine whether the current back-end 240 should be deemed as heavily or lightly loaded based on the feedback. If the system is lightly loaded, then the method may proceed to 760.

At 760, from either 740 or 750, the missing query is removed from the queue. At 770, the missing query may be delivered to the back-end database 240. At 780, the back-end database 240 updates the cache queries 320 with the missing query. The missing query is no longer "missing" from the cache queries 320.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided merely for the purpose of explanation and are in no way to be construed as limiting. While the inventions have been described with reference to various embodiments, it is understood that the words which have been used herein are words of description and illustration, rather than words of limitation. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed:

1. A method of providing query results, the method comprising:

obtaining at a distributor server and from a user a beginning portion of a query comprising a number of characters at a beginning of the query;

determining at the distributor server whether the obtained portion of the query matches a predetermined ignore entry corresponding to a portion of the query that is to be ignored, the determining being performed prior to obtaining a succeeding portion of the query from the user;

if the obtained portion of the query matches the predetermined ignore entry corresponding to the portion of the query that is to be ignored, obtaining at the distributor server the succeeding portion of the query from the user, the succeeding portion of the query comprising a succeeding number of characters of the query immediately after the beginning of the query, and assigning at the distributor server the portion of the query comprising the beginning portion of the query followed by the succeeding portion of the query to a front-end server;

if the obtained portion of the query does not match the predetermined ignore entry corresponding to the portion of the query that is to be ignored, assigning at the distributor server the beginning portion of the query to a front-end server;

obtaining at the assigned front-end server and from a data structure a plurality of other queries beginning with the assigned portion of the query, the data structure including a cache of previously submitted queries, at least some of the previously submitted queries in the cache having a corresponding set of results in a results structure;

for each of the plurality of obtained queries beginning with the assigned portion of the query:

obtaining at the front-end server the corresponding set of results from the results structure if present therein;

obtaining at the front-end server the corresponding set of results from another source if the corresponding set of results is not present in the results structure;

for all of the plurality of obtained queries beginning with the assigned portion of the query, combining at the front-end server the obtained corresponding sets of results into a combined set of results; and returning the combined set of results from the front-end server to the user, wherein the assigned portion of the query is assigned by the distributor server to one of a plurality of front-end servers, the assigning of the assigned portion of the query to one of the plurality of front-end servers comprising:

applying the assigned portion of the query to a hash function to obtain a hash result; and applying the hash result to a mapping function to obtain a mapping result comprising one of the plurality of front-end servers, the hash function and the mapping function operating to ensure that a particular assigned portion of a query is assigned to a articular one of the plurality of front-end servers.

2. The method of claim 1, further comprising:

computing a representation of the portion of the query, wherein assigning the portion of the query to a server comprises assigning the portion of the query to a server based upon the representation.

3. The method of claim 1, further comprising:

determining if the portion of the query matches a predetermined entry; and assigning succeeding characters as the portion of the query.

4. The method of claim 1, further comprising:

storing cache queries and a set of common queries in the data structure;

wherein obtaining other queries beginning with the portion of the query comprises obtaining other queries beginning with the portion of the query from the data structure.

5. The method of claim 4, further comprising:

modifying the data structure to reflect changes made to the cache queries and changes made to the set of common queries.

6. The method of claim 4, further comprising:

storing the cache queries and the set of common queries according to a frequency of use; and displaying the results of each of the other queries beginning with the portion of the query in a descending order of the frequency of use.

7. The method of claim 1, wherein obtaining results of each of the other queries beginning with the portion of the query comprises obtaining results of each of the other queries from a cache of the front-end server.

8. The method of claim 1, wherein obtaining results of each of the other queries beginning with the portion of the query comprises obtaining results of each of the other queries from a back-end server.

9. The method of claim 1, further comprising:
providing an empty result if the other queries beginning with the portion of the query cannot be obtained.

10. A query system comprising:
a distributor server that:
receives from a user a portion of a query comprising a number of characters at a beginning of the query;
determines whether the obtained portion of the query matches a predetermined ignore entry corresponding to a portion of the query that is to be ignored, the determining being performed prior to obtaining a succeeding portion of the query from the user;
if the obtained portion of the query matches the predetermined ignore entry corresponding to a portion of the query that is to be ignored, obtains at the distributor server the succeeding portion of the query from the user, the succeeding portion of the query comprising a succeeding number of characters of the query immediately after the beginning of the query, and assigning at the distributor server a portion of the query comprising the beginning portion of the query and the succeeding portion of the query to a front-end server; and
if the obtained portion of the query does not match the predetermined ignore entry corresponding to a portion of the query that is to be ignored, assigns the beginning portion of the query to a front-end server;
a data structure that stores cache queries and a set of common queries;
a results structure that provides results for the cache queries and the set of common queries; and
the front-end server that:
obtains from the data structure a plurality of other queries beginning with the assigned portion of the query;
for each of the plurality of obtained queries beginning with the assigned portion of the query:
obtains at the front-end server the corresponding set of results from the results structure if present therein;
obtains at the front-end server the corresponding set of results from another source if the corresponding set of results is not present in the results structure;
for all of the plurality of obtained queries beginning with the assigned portion of the query, combines at the front-end server the obtained corresponding sets of results into a combined set of results; and
returns the combined set of results from the front-end server to the user,
the query system further comprising a plurality of the front-end servers, the assigned portion of the query being assigned by the distributor server to one of the plurality of front-end servers by:
applying the assigned portion of the query to a hash function to obtain a hash result; and
applying the hash result to a mapping function to obtain a mapping result comprising one of the plurality of front-end servers, the hash function and the mapping function operating to ensure that a particular assigned portion of a query is assigned to a particular one of the plurality of front-end servers.

11. The system of claim 10, further comprising a back-end database.

12. The system of claim 10, wherein the distributor server assigns the portion of the query to the front-end server.

13. The system of claim 10, wherein the portion of the query is a prefix of the query.

14. The method of claim 1 wherein the data structure further includes a cache of common queries, at least some of the common queries in the cache having a corresponding set of results in the results structure, the method further comprising constructing a set of common queries, the method comprising:
compiling entries deleted from the cache of previously submitted queries;
forming the set of common queries comprised of the deleted entries, wherein the deleted entries are from a predetermined time range; and
distributing the set of common queries to another front-end server.

15. The method of claim 14, wherein distributing the set of common queries to another front-end server comprises distributing the set of common queries to multiple front-end servers.

16. The method of claim 14, further comprising:
generating additional queries based on a predetermined list; and
adding the additional queries to the set of common queries.

17. The method of claim 14, further comprising:
computing an updated set of queries for a front-end server, wherein the updated set of queries is comprised of assigned queries in the set of common queries that are assigned to the front-end server; and
constructing a data structure for the front-end server, wherein the contents of the data structure are comprised of the updated set of queries and cache queries.

18. The method of claim 17, further comprising:
computing missing queries, wherein the missing queries belong in a cache of the front-end server; and
inserting the missing queries a queue.

19. The method of claim 18, further comprising:
removing the missing queries from the queue;
sending the missing queries from the queue to a back-end database; and
inserting the missing queries in the cache of the front-end server.

20. The method of claim 17, further comprising:
determining if an expired query that is expired from the cache of the front-end server belongs to the updated set of queries;
inserting the expired query into a queue;
removing the expired query from the queue;
sending the expired query from the queue to a back-end database; and
inserting the expired query in the cache of the front-end server.

* * * * *